Nov. 14, 1961   E. HABERLE   3,008,533
RETRACTABLE TIER MOBILE HOME STEP
Filed June 19, 1959
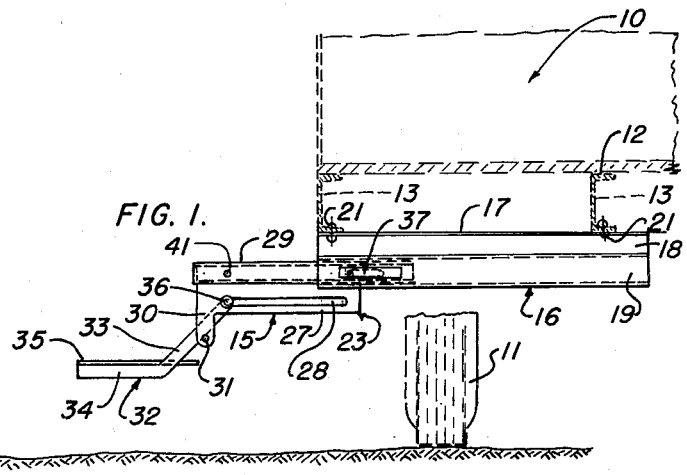
FIG. 1.
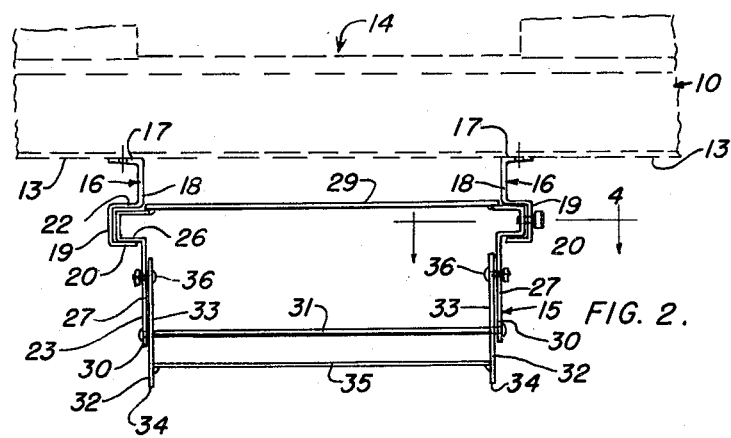
FIG. 2.
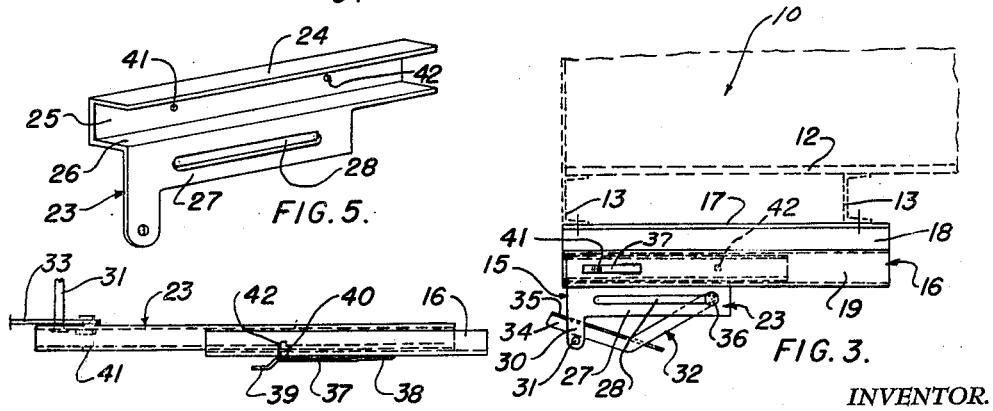
FIG. 5.
FIG. 3.
FIG. 4.
INVENTOR.
Edwin Haberle
BY Victor J. Evans & Co.
ATTORNEYS

United States Patent Office 3,008,533
Patented Nov. 14, 1961

3,008,533
RETRACTABLE TIER MOBILE HOME STEP
Edwin Haberle, Carlisle, Ind.
Filed June 19, 1959, Ser. No. 821,436
2 Claims. (Cl. 182—88)

This invention relates to a retractable step, and more particularly to a retractable step for a mobile home or trailer.

The object of the invention is to provide a step which can be readily extended as for example when a person is to enter or leave a trailer, and wherein when the step is not being used, as for example when the trailer or mobile home is moving along a roadway, the step can be moved to a retracted out of the way position.

Another object of the invention is to provide an extensible or retractable step for use with a mobile home or trailer, and wherein when the step is in extended position, a support is provided for the treads so that a person can safely and effectively use the step assembly of the present invention.

A further object of the invention is to provide a retractable tier mobile home step which is extremely simple and inexpensive to manufacture.

Other features and advantages will be apparent during the course of the following description.

In the accompanying drawings, forming a part of this application, and in which like numerals are used to designate like parts throughout the same:

FIGURE 1 is an elevational view showing the step in the extended position.

FIGURE 2 is a view taken at right angle to the view shown in FIG. 1.

FIGURE 3 is a view similar to FIGURE 1 but showing the steps in the retracted position.

FIGURE 4 is a sectional view taken on line 4—4 of FIGURE 2.

FIGURE 5 is a fragmentary perspective view illustrating certain structural details of the present invention.

Referring in detail to the drawings, the numeral 10 indicates a portion of a conventional trailer or mobile home which is mounted on the usual wheels 11, and the numeral 12 indicates the trailer floor while the numeral 13 indicates beams which are on the bottom portion of the trailer. The trailer 10 may be further provided with a doorway indicated by the numeral 14. According to the present invention there is provided a retractable and extensible step assembly which is indicated generally by the numeral 15, and the step assembly 15 provides means whereby persons may enter or leave the doorway such as the doorway 14.

The step assembly 15 of the present invention comprises a pair of spaced apart similar hangers which are each indicated generally by the numeral 16, and each of the hangers 16 include a horizontally disposed upper portion 17 which is secured to the beams 13 in any suitable manner, as for example by means of securing elements 21. Depending from the first portion 17 are vertically disposed second portions 18, FIGURE 2, and arranged at right angles with respect to the lower end of the second portions 18 are third portions 22. Depending from the third portions 22 are vertically disposed fourth portions 19, and arranged at a right angle with respect to the lower end of the fourth portions 19 are horizontally disposed fifth portions 20.

The step assembly 15 further includes a pair of similar sliding carriers which are indicated generally by the numeral 23, and each of the carriers 23 include a horizontally disposed upper first section 24 and depending from the first section 24 is a vertically disposed second section 25, there being a horizontally disposed third section 26 arranged at right angles with respect to the second section 25. A fourth section 27 which is vertically disposed, depends from the third section 26, and the fourth sections 27 are provided with elongated slots 28 therein for a purpose to be later described.

A first tread which is horizontally disposed, extends between the upper ends of the pair of carriers 23 and is secured thereto in any suitable manner, as for example by welding.

There is further provided a pair of spaced parallel bars 32, FIGURE 1. The carriers 23 are provided with depending ears 30, and the numeral 31 indicates a horizontally disposed rod which is supported by the lower end of the ears or lugs 30. The bars 32 are provided with angularly arranged inner and outer portions 33 and 34. The numeral 35 indicates a tread which extends between the portions 34 and which is secured thereto as for example by welding. Pins 36 serve to connect the ends of the bars 32 to the slotted portions 28 and the provision of the pins 36 which engage the slots 28 provide a means whereby the step can move from the extended position of FIGURE 1 to the retracted position of FIGURE 3 or vice versa.

There is further provided a manually operable locking device 37 which is adapted to be used for selectively retaining the step in the extended or retracted position, FIGURE 4. The locking device 37 includes a member which has one end thereof affixed as at 38 to one of the hangers 16. The other end portion 39 of the member 37 is offset outwardly so as to provide a convenient hand gripping portion, and the member 37 carries a pin 40 which is adapted to either selectively engage an opening 41 or an opening 42 in the adjacent carrier 23 so as to provide a means for maintaining the carrier in retracted or extended position.

From the foregoing, it is apparent that there has been provided a step assembly which is especially suitable for use on a trailer or mobile home such as the mobile home 10. The step assembly 15 is adapted to be moved to extended position as shown in FIGURE 1 or else it can be moved to the retracted position as shown in FIGURE 3 when it is not being used. When the device is to be moved to the extended position of FIGURE 1, the portion 39 of the member 37 is manually gripped so as to pull the pin 40 outwardly and this permits the carriers 23 to slide or move outwardly along the stationary hangers 16. When the carriers 23 reach their extended positions, the pin 40 will snap into the opening 42 so as to retain or maintain the carriers 23 stationary in the extended or adjusted position. Then, the pins 36 are slid forwardly in the slots 28 and the bars 32 will occupy the position as shown in FIGURE 1 so that the portions 33 of the bars 32 will engage the rod 31 and this will provide a safe support for the bars 32. It will be noted that with the parts shown in FIGURE 1, there is provided two horizontally disposed spaced apart treads or supports 35 and 29 whereby a person can readily step on the members 35 and 29 as for example when a person is entering or leaving the trailer home 10.

When the step 15 is not needed and when it is not being used, as for example when the mobile home 10 is traveling over a highway or other area, the parts can be moved to retracted position as shown in FIGURE 3, and this is accomplished by again pulling on the locking device 37 by means of the gripping portion 39 so that the pin 40 will permit the carriers 23 to slide inwardly along the hangers 16 and when the carriers reach their innermost positions, the pin 40 will engage the opening 41 so as to maintain the carriers stationary in their retracted positions. At the same time the pins 36 will slide along the slots 28 so that the bars 32 can move inwardly whereby there will be no overhang or extensions as shown in FIGURE 3 so that the trailer or mobile home can be safely and conveniently moved along a desired highway or other location.

The parts can be made of any suitable material and in different shapes or sizes.

An important aspect of the present invention is that it divides the rises into equal steps and will retract out of the way in one small unit. The step is especially suitable for use with a mobile home or trailer. The device consists of a two tier retractable step arrangement. The two tier mobile home step of the present invention makes it easier and safer to get into and out of a mobile home and can be secured in place as for example by means of bolts, welding or the like. The locking member 37 holds the step in open or closed position and when the step is in retracted position, a mobile home can be safely and conveniently driven along a desired highway or the like.

Minor changes in shape, size and rearrangement of details coming within the field of invention claimed may be resorted to in actual practice, if so desired.

What is claimed is:

1. In a step for a mobile home, a pair of spaced apart hangers each including a horizontally disposed upper first portion, a vertically disposed second portion depending from said first portion, a horizontally disposed third portion arranged at right angles with respect to the second portion, a vertically disposed fourth portion depending from said third portion, and a horizontally disposed fifth portion arranged at right angles to said fourth portion; a pair of similar spaced apart carriers each including a horizontally disposed first upper section, a vertically disposed second section depending from said first section, a horizontally disposed third section arranged at right angles to said second section, a vertically disposed fourth section depending from said third section; a horizontally disposed tread extending between said carriers and secured thereto, there being slots in the fourth sections of said carriers, vertically disposed ears depending from said carriers, a rod extending between said ears and supported thereby, a pair of similar bars each including inner and outer angularly arranged portions, pins connecting the inner portions of said bars to said slots, and a tread connected to the outer portion of said bars.

2. In a step for a mobile home, a pair of similar spaced apart hangers each including a horizontally disposed upper first portion, a vertically disposed second portion depending from said first portion, a horizontally disposed third portion arranged at right angles with respect to the lower end of said second portion, a vertically disposed fourth portion depending from said third portion, and a horizontally disposed fifth portion arranged at right angles with respect to the lower end of said fourth portion; a pair of similar spaced apart sliding carriers each including a horizontally disposed first upper section, a vertically disposed second section depending from said first section, a horizontally disposed third section arranged at right angles to said second section, a vertically disposed fourth section depending from said third section; a horizontally disposed tread extending between the upper ends of said carriers and secured thereto, there being slots in the fourth sections of said carriers, vertically disposed ears depending from said carriers, a rod extending between said ears and supported thereby a pair of similar bars each including inner and outer angularly arranged portions, pins connecting the inner portions of said bars to said slots, and a tread connected to the outer portion of said bars, there being spaced apart apertures in one of said carriers, and a manually operable locking device having one end fastened to a hanger, said locking device having a pin on its other end which is mounted for movement into and out of engagement with said apertures so as to provide a means for maintaining the carrier in retracted or extended positions.

References Cited in the file of this patent

UNITED STATES PATENTS

| | | |
|---|---|---|
| 1,148,356 | Chickering | July 27, 1915 |
| 1,832,729 | Ohnstrand | Nov. 17, 1931 |
| 2,544,799 | McCann | Mar. 13, 1951 |
| 2,678,866 | Merrett | May 18, 1954 |
| 2,779,525 | Vogel | Jan. 29, 1957 |
| 2,863,594 | Shafer | Dec. 9, 1958 |